United States Patent
Rayalu et al.

[11] Patent Number: 6,027,708
[45] Date of Patent: Feb. 22, 2000

[54] PROCESS FOR THE SYNTHESIS OF FLYASH BASED ZEOLITE-Y

[75] Inventors: Sadhana Rayalu; Nitin Kumar Labhasetwar; Purushottam Khanna, all of Nagpur, India

[73] Assignee: Council of Scientific & Industrial Research, New Delhi, India

[21] Appl. No.: 09/149,374

[22] Filed: Sep. 8, 1998

[51] Int. Cl.$^7$ .................................................. C01B 39/24
[52] U.S. Cl. ................... 423/712; 423/713; 423/DIG. 21
[58] Field of Search .................................. 423/700, 712, 423/713, DIG. 21

[56] References Cited

U.S. PATENT DOCUMENTS

| | | |
|---|---|---|
| 3,702,312 | 11/1972 | Wilson . |
| 4,226,837 | 10/1980 | Achenbach et al. ................ 423/710 |

FOREIGN PATENT DOCUMENTS

| | | |
|---|---|---|
| 63-182214 | 7/1988 | Japan . |
| 1-138115 | 5/1989 | Japan . |
| 57-034018 | 2/1994 | Japan . |
| 6-340417 | 12/1994 | Japan . |
| 7-165418 | 6/1995 | Japan . |
| 98/26101 | 6/1998 | WIPO . |

OTHER PUBLICATIONS

Weitkamp, J. et al., "Zeolites and Their Use in Petroleum Refining." Chemicals in the Oil Industry: Developments and Applications, (1991) pp. 326–347 (No Month).

Townsend, Rodney P., "Ion Exchange in Zeolites—Basic Principles." Chemistry and Industry, (1984) pp. 246–253 (No Month).

Dyer, Alan "Uses of Natural Zeolites." Chemistry and Industry (1984) pp. 241–245 (No Month).

Dwyer, John et al., Zeolites for Industry (Zeolites—an Introduction), Chemistry and Industry, (1984) pp. 237–240 (No Month).

Specification No. 89630, "Method of Preparing Synthetic Faujasite and Synthetic Faujasite so Prepared." Government of India, The Patent Office pp. 1–4 (Aug. 1963).

*Primary Examiner*—Mark L. Bell
*Assistant Examiner*—David Sample
*Attorney, Agent, or Firm*—Ladas & Parry

[57] ABSTRACT

The present invention relates to a process for the synthesis of flyash based zeolite-Y (FAZ-Y), comprising grainding and mixing of flyash with caustic soda in a ratio ranging between 1:0.4–1:1.2 to obtain a fine homogenous fusion mixture, heating the said fusion mixture in an invert vessel at about 500–600° C. for about 1–2 hours to obtain a fused mass, cooling, milling, and mixing of the said fused mass in distilled water for about 8–12 hours, subjecting the said slurry to hydrothermal crystallization at about 90–110° C. for 8 to 12 hours to obtain FAZ-Y crystals, washing the said crystals with water and then subjecting the washed crystals to oven drying at 50–60° C. to obtain the desired FAZ-Y crystals.

9 Claims, 2 Drawing Sheets

P-1: SEM Photograph of Flyash

P-1: SEM Photograph of Flyash

P-2: SEM Photograph of Flyash based Zeolite - Y

PROCESS FOR THE SYNTHESIS OF FLYASH BASED ZEOLITE-Y

FIELD OF INVENTION

This invention relates to a process for the production of flyash based Zeolite-Y (FAZ-Y). More particularly, this invention relates to siliceous Y type flyash) based zeolite with improved characteristics for specific applications as catalyst/catalyst carriers or in automotive exhaust and de-$NO_x$ catalyst. A substitute for conventional raw materials, viz. Sodium silicate and aluminate, results in cost effective production of Zeolite-Y with concomitant resolution of flyash disposal problem by way of recovery of high value added product.

The present invention, in general, relates to the production of synthetic adsorbent materials. More particularly, it relates to crystalline microporous, aluminosilicate compositions and to the hydrothermal process for preparing the same. Specifically, it relates to a process for the synthesis of highly crystalline, porous, sodium Y-zeolite compositions having a $SiO_2/Al_2O_3$ ratio varying from 2.0–4.0.

BACKGROUND OF THE INVENTION

Molecular sieves of the crystalline zeolite type are well known in the art and now comprise over 250 species of both naturally occuring and synthetic compositions. In general, crystalline zeolites are aluminosilicates whose frameworks are formed from $AlO_4$ and $SiO_4$ tetrahedra joined by the oxygen atoms and characterized by the pore openings of uniform dimensions, having significant ion-exchange capacity and being capable of reversibly desorbing an adsorbed phase which is dispersed through the internal voids of the crystal, without displacing any atoms which make up the permanent crystal structure.

Zeolite-Y is isostructural with the mineral faujasite and Zeolite-X, an aluminum rich variant of Zeolite-Y. It contains large, near spherical cages with a free diameter of 1.3 nm. Each supercage is connected tetrahedrally with four neighboring supercages via 12-membered ring windows with a crystallographic diameter of 0.74 nm. For most molecules except very bulky ones, Zeolite-Y offers a spacious cage and pore system through which they can diffuse without hindrance. The general chemical formula of the synthetically produced, anhydrous, large pore, Zeolite-Y expressed in terms of moles may be as follows: $1.0\pm0.2$ $Na_2O:Al_2O_3:nSiO_2$; wherein 'n' has values from 3 to 7. These are commercially more useful as adsorbents and they have proven to be more stable at high temperature in the presence of moisture than Zeolite-X; this may be attributed to their high silica/alumina ratio.

Zeolite-Y has multifacet applications and are being best employed as catalyst in vapor phase cracking of petroleum (Weitkemp), J., Ernst S., in Chemicals in the oil industry: development and application (Ed. P. H. ogden), Royal Society of Chemistry, Cambridge, 1991), Fluid Catalytic Cracking (Biwaaaas, J., and Maxwell, I. E., Appl.Catal, 1990 (63), 197), is omerization of light gasoline (Maxwell, E. G. Catalysis today, 1987 (1), 385) and hydrocracking of vacuum gas oil (Ward, J. W. in 'Preparation of Catalysts' (Eds: G. Poncelet, P. Gronge and P. A. Jacobs) Studies in surface. Science and Catalysis, Elsevier, Amsterdam oxford, N.Y.<1983 (1) 587). Treatment of wastewater with zeolite specifically with zeolite-Y is increasing world-wide; work in progress seeks to extend the use of zeolites for removal of isotopes (Dyer. A., Chem Ind., 1984, 241–245); long term disposal techniques and composites. Nevertheless, the development of material with interesting electrical, mechanical or other properties from zeolites has not often been reported in literature.

PRIOR ART REFERENCES

There are several processes available in the market for the synthesis of Zeolite-Y. Dyer et al. has described a process for the production of zeolites, which process comprises the following steps:

reactive starting materials, viz, sodium silicate and aluminate, taken either as freshly prepared gels or amorphous solids.

relatively high pH, obtained by using an alkali metal hydroxide and/or organic base.

either low temperature hydrothermal conditions at atmospheric (or low autogenous) pressures or high temperature hydrothermal conditions (where temperature is less than 300° C.) are employed.

a high degree of supersaturation of the components in gel phase leading to the nucleation of a large number of crystals.

crystallization time taken ranges from a few hours to several days.

However, the said and other available methods suffer from various disadvantages.

The said processes cause sintering of particles and the time consumed for crystallization of FAZ-Y is significantly long.

OBJECTS OF THE PRESENT INVENTION

As such, in order to overcome the said drawbacks in the said prior art processes, the applicants have developed the present novel process for the synthesis of Zeolite-Y from flyash. The main object of the invention is to use flyash as a raw material for production of zeolites. This provides an inexpensive alternative to commercially available zeolites (as the process involves replacement of conventional aluminum trihydrate and silicate with flyash) with concomtiant resolution of flyash disposal problem.

It is an object of the present invention to provide a process for the synthesis of flyash based Zeolite-Y wherein the fusion step is modified so as to result in the formation of sodium silicate and sodium aluminate, thereby ascertaining the probability of formation of zeolitic phases with high purity.

Another object of the invention is to provide a process wherein the fusion mixture is given proper mechanical treatment (grinding and mixing) so as to ensure complete fusion, and effective extraction of alumina/silicate from flyash with formation of homogenous alumino-silicate gel.

It is yet another object of the present invention to provide a process for the synthesis of flyash based Zeolite-Y wherein the hydrothermal conditions employed result in the exclusive crystallization of Zeolite-Y.

DETAILED DESCRIPTION OF THE INVENTION

To meet the above objects, the present invention provides a novel process for the synthesis of flyash based Zeolite-Y, comprising the following steps:

(a) grinding and mixing of flyash or pre-treated flyash with caustic soda in a ratio ranging between 1:0.4–1:1.2 to obtain a fine homogenous fusion mixture, (b) heating the said fusion mixture in an inert vessel at about 500–600° C. for about 1–2 hours to obtain a fused mass, (c) cooling, milling, and mixing of the said fused mass in distilled water for about 8–12 hours, (d) subjecting the said slurry to hydrothermal crystallization at about 90–110° C. for 8 to 12 hours to obtain FAZ-Y crystals, and (e) washing the said crystals with water and then subjecting the washed crystals to oven drying at 50–60° C. to obtain the desired FAZ-Y crystals.

According to the present invention, the source of $SiO_2$ and $Al_2O_3$ used in the process described is flyash only.

In an embodiment of the invention, the flyash used is fused with solid sodium hydroxide.

In another embodiment, alum is added to flyash in flyash alum ratio of 5:1 in the mixing stage in step 1(c) to improve the $SiO_2/Al_2O_3$ ratio.

In yet another feature of the invention, a pre-treated flyash may optionally be used and in that case, the pre-treatment flyash can be prepared by treating flyash directly with a mineral acid in flyash:mineral acid ratio of 0.25:1.

In another embodiment, flyash is directly treated with acids in flyash: acid ratio of 0.25:1.0 prior to the fusion step to improve the silica-alumina ratio of FAZ-Y.

The invention also provides a process for preparing silica enriched FAZ-Y which further comprises of the following steps:

treating Na-FAZ-Y with calcium solution to obtain Ca-FAZ-Y;

treating Ca-FAZ-Y with ethylene diamine tetracetic acid to obtain chelated FAZ-Y product.

refluxing for 8–10 hours to obtain dealuminated FAZ-Y;

washing and drying the product.

Still, another feature of the invention is a process for synthesis of FAZ-Y wherein the Zeolite-Y synthesized has the following characteristics:

calcium binding capacity up to 420 meq/100 g.

average particle size (d50) of less than 6 microns.

crystallinity of about 90–95%.

cubic crystal structure.

specific surface area of about 550 $m^2/g$.

BRIEF DESCRIPTION OF THE ACCOMPANYING DRAWINGS:

Figure 1:
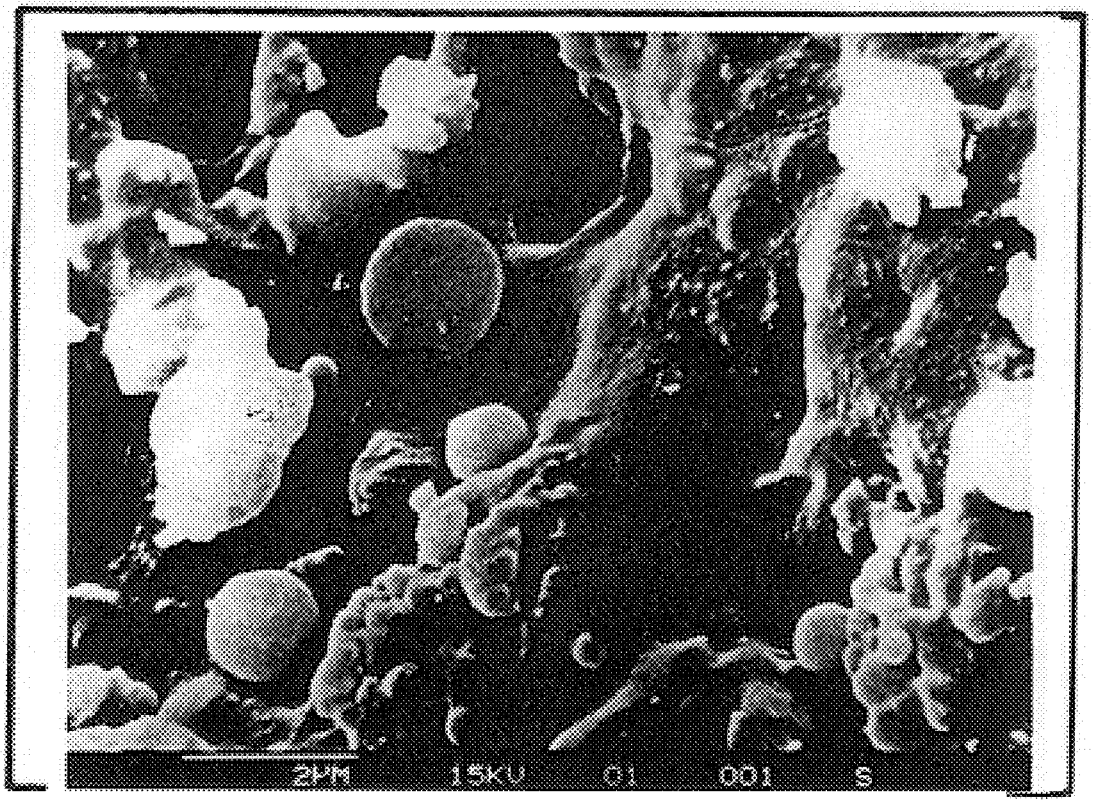
FIG. 1 shows that morphologically flyash is made up mainly of cenospheres and pleurospheres and is mostly amorphous.
Figure 2:
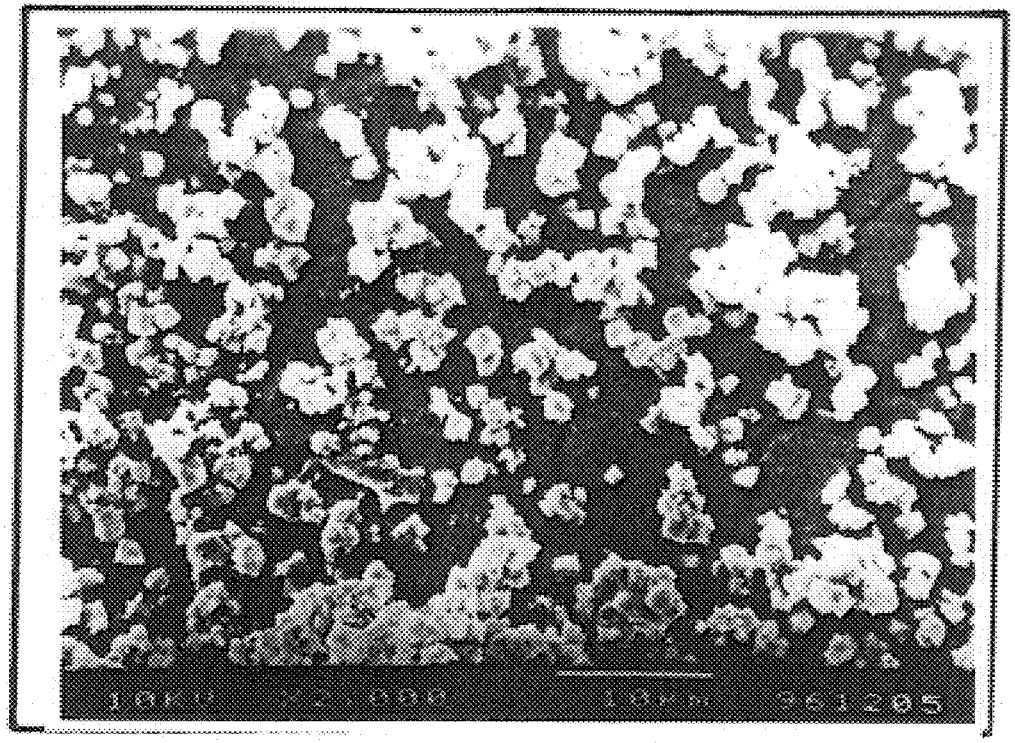
FIG. 2 shows the morphology of zeolite crystals clearly illustrates the transformation of amorphous flyash into crystalline material.

In the present invention, FAZ-Y is synthesized by fusing flyash (20 g) with sodium hydroxide (8–24 g). A homogenous fusion mixture is prepared by proper grinding, and mixing of flyash and alkali in a ratio of about 1:1.2. This mixture is heated to at least about 500° C. preferably between 550–600° C. for about 1–2 hours to obtain the fused mass. The resultant fused mass is cooled to room temperature, milled again and then stirred vigorously in water for 8–10 hours to obtain amorphous alumino-silicate gel. This solid alumino-silicate gel is then subjected to crystallization at 90–110° C. for 8–12 hours to obtain FAZ-Y crystals. The solid crystalline product is then recovered by filtration, washed with water and dried at temperature of about 50–60° C.

The quantitative extraction of $SiO_2$ and $Al_2O_3$ from flyash is dependet on the amount of sodium hydroxide in the reaction system and is evident from the results presented in table 6. The residual amount of sodium hydroxide not consumed in the extraction of $SiO_2$ and $Al_2O_3$ from flyash is useful in maintaining the high alkaline pH of the reaction system, a necessary pre-requisite.

The effect of fusion temperature on zeolite formation is quite predominant and is presented in Table 4. No zeolite formation was observed at fusion temperature of 200° C. indicating that extraction of silicates and aluminates was negligible. Formation of zeolitic phases with maximum crystallinity was observed at 500–600° C. At higher temperature, the crystallinity gradually decreased and may be attributed to sintering of flyash to form non-crystaline glassy mass.

Insufficient concentration of alkali as observed for NaOH/flyash ratio of 0.4, leads to lower extraction efficiency of NaOH for $SiO_2$ and $Al_2O_3$ from flyash and also adversely effects the crystallization process. Increase in $Al_2O_3$ content of reaction mixture by addition of 1.65 g of sodium aluminate leads to transformation of zeolite-Y to zeolite-X. With further increase in $Al_2O_3$ content (by addition of sodium aluminate up to 8 g ) zeolite-X transforms into zeolite-A.

The ratio of flyash to caustic soda employed in the present invention is important. If any additional alumina such as, sodium aluminate or aluminum hydroxide is added to the mixture, such addition shifts the equilibrium of the present process from the formation of Zeolite-Y to Zeolite-A. Further, the temperature and the time ranges of the hydrothermal crystallisation are also critical to the present invention.

The effect of addition of sodium chloride and seeding to improve $SiO_2$ and $Al_2O_3$ has also been evaluated. Enrichment of $SiO_2$ content of flyash through Ets direct acid treatment has been explored. Improvement of $SiO_2$ content in zeolite by way of addition of alum in mixing stage to increase incorporation of $SiO_2$ in zeoHte matrix has also been evaluated. The addition of alum in the mixing step decreases the pH of the reaction system, thus decreasing the solubility of $SiO_2$ in the system.

The alumino-silicate compound obtained after fusion is amorphous and changes to crystalline state when subjected to hydrothermal crystallization. A close scrutiny of the results presented in table 8 reveals that crystallization time influences the zeolitic crystallinity significantly. Percent crystallinity of zeolite-Y increases significantly up to 10 hrs. and remains constant beyond that.

Calcium Binding Capacity

The Calcium Binding Capacity (CBC) of aluminosilicates is determined as follows:

1 liter of aqueous solution containing 0.5 of $CaCl_2$ and adjusted to a pH of 9–10 with dilute NaOH, is mixed with 1 g of alumino-silicate (FAZ-Y). The suspension is then stirred vigorously for 15 minutes at room temperature (29–30° C.). After filtration, the residual hardness of the filtrate is determined. From the difference between hardness of the original solution and filtrate the CBC is calculated as meq/100 g. The FAZ-Y samples were dissolved in $HNO_3$ and analyzed by ICP-AES (Model: YJ 24) for $Al_2O_3$ while $SiO_2$ was estimated using instrumental/conventional method $Na_2O$ is estimated using flame photometer (Mediflame-127 with FPM compressor unit 122). The trend observed for CBC as function of fusion temperature is similar. The CBC value (140 meq/100 g) is quite low at 200° C. while significant increase in CBC at 600° C. (420 meq/100 g) was recorded. Beyond a temperature of 600° C. there was decrease in CBC value (380 meq/100 g).

In terms of CBC it can be said that it increases up to NaOH/flyash ratio 1.2; remains constant at NaOH/flyash ratio of 1.6, and starts decreasing with further increase in alkali content and may be attributed to formation of undesirable product viz sodalite. The exact reason(s) for these mechanisms remain to be investigated.

The surface morphology of the zeolite has been examined by Jeol-840-A scanning electron microscope (SEM) wherein Powder XRD analysis was employed to monitor zeolite formation process, using CuKα as source of X-rays (Model: Philips PN-1830). D-spacing values reported (in A°) JCPDS file (38–238) for zeolite-Y were used as standard for comparison. Specific surface area was determined using Micromeretics-ASAP-200 analyser.

In the drawings, which are in the form of photographs, photograph 1 depicts that morphologically flyash is made up mainly of cenospheres and pleurospheres and is mostly amorphous. Photograph 2 depicts the morphology of zeolite crystals and clearly illustrates the transformation of amorphous flyash into crystalline material.

The chemical composition of flyash is detailed in Table 1.

TABLE 1

Chemical composition of Flyash

| Component | % weight (dry basis) |
|---|---|
| $SiO_2$ | 61.63 |
| $Al_2O_3$ | 25.75 |
| $Fe_2O_3$ | 5.96 |
| CaO | 3.07 |
| MgO | 2.01 |
| $Mn_3O_4$ | 0.15 |
| Sulphites | Nil |
| $Na_2O$ | 0.15 |
| $K_2O$ | 0.17 |

Comparative analysis of FAZ-Y sample synthesized at optimal conditions and commercially available Zeolite-Y is provided in Table 2. It is evident from the results that the synthesized FAZ-Y matches quite well with the commercially procured zeolite sample. The estimated cost of production is considerably less than the commercial Zeolite-Y due to use of flyash as a source of silica and alumina.

TABLE 2

Comparative characteristics of FAZ-Y and commercial Zeolite-Y

| | | Zeolite-Y | |
|---|---|---|---|
| S.No. | Characteristics | Synthesized | Commercial |
| 1. | Surface area ($m^2/g$) | 500–550 | 550–600 |
| 2. | Exchange capacity (meq/100 g) | 340–420 | 420 |
| 3. | Average particle size (d50) (micron) | 4–5 | 8–10 |
| 4. | Crystal structure | Cubic | Cubic |
| 5. | $SiO_2/Al_2O_3$ | 2.0–4.0 | 2.0–2.5 |

The following examples illustrate the influence of different parameters viz. fission temperature, NaOH/flyash ratio, crystallization time/temperature but does not restrict the scope of the present invention. These examples also suggest the best mode of carrying out the invention.

EXAMPLE 1

Preweighed sample of flyash (20 g) and sodium hydroxide (24 g) were properly grinded/milled and mixed to obtain a homogeneous fusion mixture, and placed in a vessel inert towards the reaction mixture and heated to about 500–600° C. for 1–2 hrs. The fused mass was cooled, milled and mixed thoroughly with distilled water for 8–10 hrs. The amorphous alumino-silicate gel was then subjected to crystallization for 8–12 hrs at about 90–110° C. The solid crystalline product was recovered by filtration, washed with water and oven dried at 50–60° C. The CBC and surface area of FAZ-Y is 420 meq/100 g and 500–550 $m^2/g$ respectively. The $SiO_2/Al_2O_3$ ratio is around 2.0. d-spacing values (in A°) reported for Zeolite-Y in JCPDS file (38–238) are 14.30, 8.75, 7.46, 5.68, 4.76, 4.38, 3.77, 2.85 and 2.63. It compares well with FAZ-Y and are as follows:

TABLE 3 d-spacing values obtained for FAZ-Y (Example 1/Sample 1)

| d-spacing (A°) FAZ-Y Example 1 Sample 1 | Relative intensity (%) FAZ-Y Example 1 Sample 1 |
|---|---|
| 14.15 | 96.7 |
| 8.73 | 27.2 |
| 7.46 | 20.7 |
| 5.69 | 42.7 |
| 4.78 | 12.6 |
| 4.39 | 24.8 |
| 3.79 | 81.4 |
| 2.87 | 100.0 |
| 2.65 | 42.6 |

EXAMPLE 2

The same process as mentioned in example 1 was repeated except for the variation in fusion temperature. The reaction conditions pertaining to these examples are presented in Table 4 alongwith the CBC values and $SiO_2/Al_2O_3$ ratios.

TABLE 4

Variation of reaction conditions and Characteristics of FAZ-Y

| S. No. | Fusion temp. (° C.) | NaOH (g) | Flyash (g) | Crystallisation time/temp hrs/° C. | CBC (meq/ 100 g) | $SiO_2/Al_2O_3$ |
|---|---|---|---|---|---|---|
| 1. | 200 | 24 | 20 | 10/100 | 140 | 2.4 |
| 2. | 600 | 24 | 20 | 10/100 | 420 | 2.0 |
| 3. | 800 | 24 | 20 | 10/100 | 380 | 1.6 |

FAZ-Y synthesized at fusion temperature of 200, 600 and 800° C. were designated as FAZ-Y1, FAZ-Y2 and FAZ-Y3. d-spacing values (in A°) reported for Zeofite-Y in JCPDS file (38–238) are 14.30, 8.75, 7.46, 5.68, 4.76, 4.38, 3.77, 2.85 and 2.63. It compares well with FAZ-Y2 and FAZ-Y3 and are as follows:

TABLE 5 d-spacing values obtained for FAZ-Y1-FAZ-Y3
(Example2/Sample 1–3)

| d = spacing (A°) | | | Relative intensity (%) | | |
|---|---|---|---|---|---|
| FAZ-Y1 Sample1 | FAZ-Y2 Example 2 Sample2 | FAZ-Y3 Sample3 | FAZ-Y1 Sample1 | FAZ-Y2 Example 2 Sample2 | FAZ-Y3 Sample3 |
| 13.82 | 14.15 | 14.0 | 38.4 | 96.7 | 83.5 |
| 8.63 | 8.73 | 8.67 | 11.4 | 27.2 | 25.9 |
| 7.39 | 7.46 | 7.42 | 13.8 | 20.7 | 21.5 |
| 5.64 | 5.69 | 5.66 | 33.3 | 42.7 | 45.9 |
| 4.74 | 4.78 | 4.76 | 14.77 | 12.6 | 12.6 |
| 4.36 | 4.39 | 4.37 | 24.7 | 24.8 | 24.9 |
| 3.77 | 3.79 | 3.78 | 72.9 | 81.4 | 83.1 |
| 2.86 | 2.87 | 2.86 | 100.0 | 100.0 | 100.0 |
| 2.64 | 2.65 | 2.64 | 38.9 | 42.6 | 39.4 |

EXAMPLE 3

The same process as mentioned in example 1 was repeated except for the variation in NaOH/flyash ratio. FAZ-Y was synthesized at different NaOH/flyash ratios of 0.4, 0.8, 1.2, 1.6 and 2.0; the samples so obtained were designated as FAZ-Y4, FAZ-Y5, FAZ-Y6, FAZ-Y7 and FAZ-Y8.

The CBC and $SiO_2/Al_2O_3$ ratio obtained for FAZ-Y4, FAZ-Y5, FAZ-Y6, FAZ-Y7 and FAZ-Y8 are presented in Table 6.

TABLE 6

Variation of reaction conditions and characteristics of FAZ-Y

| S. No. | Fusion temp. (° C.) | NaOH (g) | Flyash (g) | Crystallisation time/temp (hrs/° C.) | CBC (meq/ 100 g) | $SiO_2$/ $Al_2O_3$ Ratio |
|---|---|---|---|---|---|---|
| 1. | 550 | 8  | 20 | 10/100 | 160 | 2.4 |
| 2. | 550 | 16 | 20 | 10/100 | 260 | 2.2 |
| 3. | 550 | 24 | 20 | 10/100 | 420 | 2.0 |
| 4. | 550 | 32 | 20 | 10/100 | 340 | 1.6 |
| 5. | 550 | 40 | 20 | 10/100 | 240 | 0.86 | d-spacing values (Table 7) obtained for FAZ-Y6 compare well with the zeolite-Y reported in JCPDS file (38–238); whereas it differs significantly for FAZ-Y7 and FAZ-Y8. XRD patterns for FAZ-Y4 and FAZ-Y5 indicate their amorphous nature. The XRD patterns for FAZ-Y7 and FAZ-Y8 match closely with that for sodalite hydrate (Sidheswaran, P., Bhat, N, A; Indian Journal of Chemistry, 1995 (34A), 800).

TABLE 7 d-spacing values obtained for FAZ-Y4–FAZ-Y8 (Example 3/Sample 1–5)

| d-spacing (A°) | | | | | Relative intensity (%) | | | | |
|---|---|---|---|---|---|---|---|---|---|
| FAZ-Y4 sample 1 | FAZ-Y5 sample 2 | FAZ-Y6 Example 3 sample 3 | FAZ-Y7 sample 4 | FAZ-Y8 sample 5 | FAZ-Y4 sample 1 | FAZ-Y5 sample 2 | FAZ-Y6 Example 3 sample 3 | FAZ-Y7 sample 4 | FAZ-Y8 sample 5 |
| — | — | 14.15 | — | 13.21 | — | — | 96.7 | — | 21.1 |
| — | — | 8.73 | — | — | — | — | 27.2 | — | — |
| — | 7.44 | 7.46 | — | — | — | 18.3 | 20.7 | — | — |
| — | — | 5.69 | — | — | — | — | 42.7 | — | — |
| — | — | 4.78 | — | 4.86 | — | — | 12.6 | — | 2.6 |
| — | — | 4.39 | — | — | — | — | 24.8 | — | — |
| — | — | 3.79 | 3.75 | — | — | — | 81.4 | 3.7 | — |
| 2.85 | — | 2.87 | 2.85 | 2.82 | 4.7 | — | 100.0 | 15.9 | 35.4 |
| 2.63 | — | 2.65 | 2.57 | — | 2.0 | — | 42.6 | 61.5 | — |

EXAMPLE 4

The same process as mentioned in example1 was repeated except for the variation in crystallization time. The reaction conditions pertainig to these examples are presented in Table 8 alongwith the CBC values and $SiO_2/Al_2O_3$ ratios.

TABLE 8

Variation of reaction condition and characteristics of FAZ-Y

| S. No. | Fusion temp. (° C.) | NaOH (g) | Flyash (g) | Crystallisation time/temp (hrs/° C.) | CBC (meq/ 100 g) | $SiO_2$/ $Al_2O_3$ |
|---|---|---|---|---|---|---|
| 1. | 550 | 24 | 20 | 0/100  | 160 | 1.8 |
| 2. | 550 | 24 | 20 | 2/100  | 240 | 1.9 |
| 3. | 550 | 24 | 20 | 4/100  | 200 | 1.9 |
| 4. | 550 | 24 | 20 | 8/100  | 380 | 1.9 |
| 5. | 550 | 24 | 20 | 10/100 | 420 | 2.0 |
| 6. | 550 | 24 | 20 | 12/100 | 410 | 2.0 |
| 7. | 550 | 24 | 20 | 24/100 | 380 | 2.1 |

The FAZ-Y samples synthesized at crystallization time of 0 hr, 2 hr, 4 hr, 8 hr, 10 hr, 12 hr and 24 hr were designated as FAZ-Y9, FAZ-Y10, FAZ-Y11, FAZ-Y12 FAZ-Y13, FAZ-Y14 and FAZ-Y15 respectively.

d-spacing values reported in JCPDS file (38–238) for zeolite-Y compare well with FAZ-Y13, FAZ-Y14 and FAZ-Y15 whereas it differs significantly for FAZ-Y9, FAZ-Y10, FAZ-Y11 and FAZ-Y12. (See Table 9 also)

EXAMPLE 5

The same process was repeated as described in example 1 except that there was a brief mixing time i.e. the amorphous alumino-silicate was subjected directly to crystalization after mixing for a time of about 15 minutes.

TABLE 9 d-spacing Values Obtained for FAZ-Y9–FAZ-Y15 (Example 4/Sample 1–7)

d-spacing A° Example 4 Sample

| 1 FAZ-Y9 | 2 FAZ-Y10 | 3 FAZ-Y11 | 4 FAZ-Y12 | 5 FAZ-Y13 | 6 FAZ-Y14 | 7 FAZ-Y15 |
|---|---|---|---|---|---|---|
| 14.34 | 12.9 | 13.8 | 13.78 | 14.15 | 14.0 | 14.0 |
| — | — | — | — | 8.73 | 8.68 | 8.66 |
| — | — | — | — | 7.46 | 7.42 | 7.39 |
| — | — | — | 5.66 | 5.69 | 5.66 | 5.66 |
| — | — | — | 4.75 | 4.78 | 4.76 | 4.76 |
| — | — | — | 4.36 | 4.39 | 4.37 | 4.37 |
| 3.73 | 3.66 | — | 3.77 | 3.79 | 3.78 | 3.77 |
| 2.88 | 2.82 | 2.83 | 2.86 | 2.87 | 2.86 | 2.86 |
| 2.68 | 2.68 | 2.66 | 2.64 | 2.65 | 2.64 | 2.64 |

Relative Intensity (%) Example 4 Sample

| 1 FAZ-Y9 | 2 FAZ-Y10 | 3 FAZ-Y11 | 4 FAZ-Y12 | 5 FAZ-Y13 | 6 FAZ-Y14 | 7 FAZ-Y15 |
|---|---|---|---|---|---|---|
| 12.2 | 64.2 | 31.28 | 40.6 | 96.7 | 76.6 | 84.6 |
| — | — | — | — | 27.2 | 22.5 | 22.7 |
| — | — | — | — | 20.7 | 21.50 | 21.1 |
| — | — | — | 16.2 | 42.7 | 42.7 | 44.2 |
| — | — | — | 8.2 | 12.5 | 11.9 | 13.5 |
| — | — | — | 11.2 | 24.8 | 23.8 | 26.1 |
| 15.12 | 24.7 | — | 39.0 | 81.4 | 82.0 | 84.4 |
| 31.8 | 44.8 | 46.28 | 92.2 | 100.0 | 100.0 | 100.0 |
| 20.4 | 25.9 | 24.67 | 39.0 | 42.6 | 42.6 | 41.2 |

The CBC values for FAZ-Y16 and FAZ-Y17 are 420 and 340 meq/100 g respectively. The $SiO_2/Al_2O_3$ ratio are as follows:

TABLE 10

Variation of reaction conditions and characteristics of FAZ-Y

| Sr. No. | Fusion Temp. (° C.) | NaOH | Flyash | Mixing Time min. | Crystallisation time/temp. hr/° C. | CBC (meq/100 g) | $SiO_2/Al_2O_3$ |
|---|---|---|---|---|---|---|---|
| 1 | 550 | 24 (with 5 g of NaCl) | 20 | 15 | 10/100 | 420 | 1.9 |
| 3 | 550 | 24 | 20 | 15 | 10/100 | 340 | 1.8 | d-spacing values reported for Zeolite-Y in JCPDS file (38–238) compare well with FAZ-Y16 and FAZ-Y17 and are as follows:

TABLE 11 d-spacing values obtained for
FAZ-Y16-FAZ-Y17(Example5/Sample 1–2)

| d-spacing A° | | Relative Intensity (%) | |
|---|---|---|---|
| FAZ-Y16 Example 5 Sample1 | FAZ-Y17 Example 5 Sample2 | FAZ-Y16 Example 5 Sample 1 | FAZ-Y17 Example 5 Sample 2 |
| 14.0 | 14.31 | 44.0 | 14.40 |
| 8.67 | 8.34 | 13.3 | 3.97 |
| 7.42 | — | 10.6 | — |
| 5.67 | 5.65 | 35.9 | 4.26 |
| 4.76 | 4.75 | 13.7 | 3.73 |
| 4.38 | 4.37 | 25.6 | 4.85 |
| 3.78 | 3.76 | 100.0 | 100.0 |
| 2.87 | 2.86 | 77.9 | 29.5 |
| 2.64 | 2.64 | 26.0 | 22.1 |

EXAMPLE 6

The fusion step of flyash and sodium hydroxide was repeated. as described in example 1. The fused mass was cooled, milled and mixed thoroughly with distilled water for 10 hrs with simultaneous addition of alum solution (5%). The amorphous alumino-silicate gel was then subjected to crystallization for 8–12 hrs at about 90–110° C. The solid crystalline product was recovered by filtration washed with water and oven dried at 50–60° C. The CBC observed is 340 meq/100 g. d-spacing values reported for FAZ-Y18 in JCPDS file (38–238) are 14.30, 8.75, 7.46, 5.68, 4.76, 4.38, 3.77, 2.85 and 2.63. It compares with FAZ-Y18 and are as follows:

TABLE 12 d-spacing values obtained for FAZ-Y18 (Example 6/Sample 1)

| d-spacing A° FAZ-Y18 Example 6 Sample 1 | Relative Intensity (%) FAZ-Y18 Example 6 Sample 1 |
|---|---|
| 14.20 | 98.0 |
| 8.75 | 24.1 |
| 7.47 | 20.5 |
| 5.70 | 41.9 |
| 4.79 | 14.5 |
| 4.40 | 27.5 |
| 3.79 | 83.8 |
| 2.87 | 100.0 |
| 2.65 | 46.1 |

EXAMPLE 7

Flyash was treated with hydrochloric acid (6–8N) for 10–24 hrs at about 100–110° C. The acid treated flyash slurry was cooled and filtered. The solid product was washed with water and dried at about 110–120° C.

The acid treated flyash so obtained was fused with sodium hydroxide as described in example 1. The fused mass was cooled, milled and mixed thoroughly with distilled water for 1–2 hrs. The amorphous alumino-silicate gel was then subjected to crystallization for 8–12 hrs at about 90–110° C. The solid crystalline product was recovered by filtration, washed with water and oven dried at 50–60° C. The CBC is 280 meq/100 g d-spacing values reported for Zeolite-Y in JCPDS file (38–238) compare well with FAZ-Y19 and are as follows:

TABLE 13 d-spacing values obtained for FAZ-Y19 (Example 7/Sample 1)

| d-spacing A° FAZ-Y19 Example 7 Sample 1 | Relative Intensity (%) FAZ-Y19 Example 7 Sample 1 |
|---|---|
| 14.07 | 56.20 |
| 8.70 | 14.35 |
| 7.43 | 13.49 |
| 5.67 | 32.0 |
| 4.77 | 11.8 |
| 4.37 | 23.7 |
| 3.78 | 75.25 |
| 3.32 | 100.0 |
| 2.87 | 79.0 |
| 2.65 | 30.3 |

EXAMPLE 8

The same process as mentioned in example 1 was repeated except for additional dealumination step using chelation technique.

The solid FAZ-Y obtained as per the process of example1 was treated with $CaCl_2$ solution at 10–12 pH to obtain Ca Exchanged FAZ-Y form (Ca-FAZ-Y) The Ca-FAZ-Y was ffrth& treated with EDTA solution (5–6 g/30–40 ml of water) and stirred continuously for 3–4 hrs. The reaction mixture was then refluxed for about 8–10 hrs at 100–110° C. The solid crystalline product was recovered by filtration and washed thoroughly to obtain modified/dealuminated Zeolite-Y. The CBC is 240 meq/100 g. d-spacing values reported for Zeolite-Y in JCPDS file (38–238) compare well with FAZ-Y and are as follows:

TABLE 14 d-spacing values obtained for FAZ-Y20 (Example 8/Sample 1)

| d-spacing A° FAZ-Y20 Example 8 Sample 1 | Relative Intensity (%) FAZ-Y20 Example 8 Sample 1 |
|---|---|
| 14.16 | 88.8 |
| 8.74 | 20.4 |
| 7.45 | 20.5 |
| 5.69 | 41.4 |
| 4.77 | 14.4 |
| 4.39 | 28.5 |
| 3.79 | 82.5 |
| 3.32 | 99.5 |
| 2.87 | 100.0 |
| 2.65 | 42.8 |

Main advantages of FAZ-Y Synthesis

1. Provides an inexpensive alternate to commercial grade zeolite-Y.
2. Provides effective substitute for the preparation of
   Molecular sieves/catalyst,
   Zeolite composites/membranes,
   Abrasive tools and brake liners and
   Catalyst carriers.

3. Economically viable and technically non-tedious process (eliminates tedious process of preparing gels/sols etc.).

4. Tackles at least partially the adverse environmental effects envisaged for flyash.

5. High value utilization of flyash.

In addition to the above, the process formulated in the present invention has the following advantages:

The modified/improved fusion step employed results in the formation of sodium silicate and sodium aluminate, thus ascertaining the probability of formation of zeolite phases with high purity. Proper mechanical treatment (grinding and mixing) of fusion mixture ensures complete fusion, and effective extraction of alumina/silica from flyash with formation of homgenous alumino-silicate gel.

Proper grinding and mixing of fusion mixture also avoids the formation of glassy phase and sintering of flyash particles. This also helps in increasing fusion temperature for better extraction of aluimnosilicates from flyash, without sintering of particles.

The hydrothermal conditions employed results in the crystallization of flyash based Zeolite-Y exclusively.

High concentration of alkali and promoters in the form of trace elements and certain salts provides conditions for faster crystallization of FAZ-Y.

The crystallinity of FAZ-Y is significantly high (90–95%), which is important for its possible industrial application as catalysts/catalyst carrier.

We claim:

1. A process for the synthesis of flyash based zeolite-Y (FAZ-Y), the process comprising the following steps:

(a) forming a fine homogenous fusion mixture of flyash or pre-treated flyash with sodium hydroxide, the flyash or pre-treated flyash being present in the mixture with respect to the sodium hydroxide in a weight ratio of 1:0.4 to 1:1.2, (b) heating the fusion mixture at about 500–600° C. for about 1–2 hours to obtain a fused mass, (c) cooling and milling the fused mass and mixing the fused mass in distilled water for about 8–12 hours to form a product, (d) subjecting the product of step (c) to hydrothermal crystallization at about 90–110° C. for 8–12 hours to obtain FAZ-Y crystals, and (e) washing the crystals with water and then subjecting the washed crystals to oven drying at 50–60° C. to obtain washed and dried FAZ-Y crystals.

2. A process as claimed in claim 1, wherein pre-treated flyash is employed in step (a), said pre-treated flyash being prepared by treating flyash directly with a mineral acid in a flyash: mineral acid ratio of 0.25:1.

3. A process as claimed in claim 1, wherein the FAZ-Y crystals obtained in step (e) comprise $SiO_2$ and $Al_2O_3$, said $SiO_2$ and $Al_2O_3$ being provided by the flyash or pre-treated flyash only.

4. A process as claimed in claim 1, wherein the flyash or pre-treated flyash is mixed with solid sodium hydroxide in step (a).

5. A process as claimed in claim 1, wherein step (c) further comprises adding alum to the fused mass during the mixing, said alum being added in a flyash: alum ratio of 5:1.

6. A process as claimed in claim 5, wherein pre-treated flyash is employed in step (a), said pre-treated flyash having been treated with acid in a flyash: acid ratio of 0.25:1.0.

7. A process for preparing FAZ-Y as claimed in claim 1, wherein said FAZ-Y has the following characteristics:

calcium binding capacity up to 420 meq/100 g;

average particle size (d50) of less than 6 microns;

crystallinity of about 90–95%;

cubic crystal structure; and a specific surface area of about 550 $m^2$/g.

8. A process as claimed in claim 1, wherein the fine homogenous fusion mixture in step (a) is formed by grinding and mixing the flyash or pre-treated flyash with the sodium hydroxide.

9. A process as claimed in claim 1, wherein the flyash or pre-treated flyash is mixed with caustic soda in step (a).

* * * * *

UNITED STATES PATENT AND TRADEMARK OFFICE
CERTIFICATE OF CORRECTION

PATENT NO.     : 6,027,708
DATED          : February 22, 2000
INVENTOR(S)    : Sadhana Rayalu et al.

It is certified that error appears in the above-identified patent and that said Letters Patent is hereby corrected as shown below:

<u>Title page,</u>
Insert -- [30] Foreign Application Priority Data July 24, 1998 [In] India 2163/DEL/98 --.

Signed and Sealed this

Eighth Day of April, 2003

JAMES E. ROGAN
*Director of the United States Patent and Trademark Office*